US010294538B2

(12) United States Patent
Lapierre-Boire

(10) Patent No.: US 10,294,538 B2

(45) Date of Patent: May 21, 2019

(54) PLASTIC INJECTION MOLD TOOLING AND A METHOD OF MANUFACTURE THEREOF

(71) Applicant: A. Finkl & Sons Co., Chicago, IL (US)

(72) Inventor: Louis-Philippe Lapierre-Boire, Sorel (CA)

(73) Assignee: A. FINKL & SONS CO., Chicago, IL (US)

( * ) Notice: Subject to any disclaimer, the term of this patent is extended or adjusted under 35 U.S.C. 154(b) by 379 days.

(21) Appl. No.: 14/998,701

(22) Filed: Feb. 5, 2016

(65) Prior Publication Data

US 2017/0226605 A1 Aug. 10, 2017

(51) Int. Cl.

| | |
|---|---|
| ***C21D 9/00*** | (2006.01) |
| ***C21D 8/00*** | (2006.01) |
| ***C21D 6/00*** | (2006.01) |
| ***B22D 27/00*** | (2006.01) |
| ***B22D 27/15*** | (2006.01) |
| ***B29C 33/38*** | (2006.01) |
| ***C22C 38/46*** | (2006.01) |
| ***C22C 38/44*** | (2006.01) |
| ***C22C 38/04*** | (2006.01) |
| ***C22C 38/02*** | (2006.01) |
| ***C22C 38/06*** | (2006.01) |
| ***C22C 38/00*** | (2006.01) |

(52) U.S. Cl.

CPC ......... *C21D 9/0068* (2013.01); *B22D 27/003* (2013.01); *B22D 27/15* (2013.01); *B29C 33/3842* (2013.01); *C21D 6/004* (2013.01); *C21D 6/005* (2013.01); *C21D 6/008* (2013.01); *C21D 8/005* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *B29K 2905/12* (2013.01)

(58) Field of Classification Search

CPC .... C21D 9/0068; C21D 8/0065; C21D 6/008; C21D 6/005; C21D 6/004; C22C 38/46; C22C 38/44; C22C 38/04; C22C 358/02; C22C 38/06; C22C 38/02; B22D 27/003; B22D 27/15; B29C 33/3842

See application file for complete search history.

(56) References Cited

FOREIGN PATENT DOCUMENTS

| | | | | |
|---|---|---|---|---|
| JP | 2003-138342 | * | 5/2003 | ............. C22C 38/58 |
| JP | 2011-195917 | * | 10/2011 | ............. C22C 38/58 |
| JP | 2013-019001 | * | 1/2013 | ............. C22C 38/24 |
| KR | 100960088 61 | | 5/2010 | |

OTHER PUBLICATIONS

English Abstract and English Machine Translation of Maeda et al. (JP 2011-195917) (Oct. 6, 2011).*

Enghlish Abstract and English Machine Translation of Shioda et al. (JP 2003-138342) (May 14, 2003).*

English Abstract and English Machine Translation of Imataka et al. (JP 2013-019001) (Jan. 31, 2013).*

International Search Report related to Application No. EP 17165518.6 dated Oct. 9, 2017.

Satyendra: "Vacuum Deagassing Processes for Liquid Steel", (Jul. 12, 2016), pp. 1-13, XP002773910, Retrieved from the Internet: URL:http://ispatguru.com/vacuum-degassing-processes-for-liquid-steel/ [retrieved on Sep. 18, 2017] p. 1, paragraph 3; p. 6.

"Casting Processes" In: James G. Bralla: "Handbook of Manufacturing Processes", 2007, Industrial Press, Inc., New York, XP002773911, pp. FP-33, p. 4, col. 2, paragraph 3; p. 6.

* cited by examiner

*Primary Examiner* — Jessee R Roe

(74) *Attorney, Agent, or Firm* — Miller, Matthias & Hull LLP

(57) ABSTRACT

Uniform hardenability is achieved in plastic injection mold and die block tooling of 20 inches and larger by the use of 0.05-0.20 vanadium in conjunction with low carbon steel in which ingots are hot worked to form mold and die blocks having cross sections of 20 inches and larger followed by water quenching and tempering.

6 Claims, No Drawings

PLASTIC INJECTION MOLD TOOLING AND A METHOD OF MANUFACTURE THEREOF

The invention pertains to plastic injection mold tooling, and also large forgings, formed from a low carbon mold steel having markedly increased hardening and hardenability properties in large sections as contrasted to currently available commercial products. The above attributes are obtained together with equal or better machinability and improved mold parting line wear. When manufactured in conjunction with a double melt process, this invention can improve significantly polishing characteristics and other attributes of molded parts in tooling sets.

BACKGROUND OF THE INVENTION

The place of plastics in the automotive industry has grown tremendously as it is the key to future high performance, more fuel efficient vehicles. Plastics offer designers and engineers multiple advantages in many applications by providing lightweight and versatile designs as well as lower manufacturing costs. The versatility of plastics can be expressed by the wide range of shapes and surfaces finishes now possible. However, this versatility would not be possible without quality plastic injection mold steels. The increasing demand for fuel efficient cars is pushing designers to create more aerodynamic cars, which in turn require larger complex plastic parts such as bumpers, dashboards and door panels. Other industries have similar requirements for plastic parts such as exterior furniture. Plastic injection molding is used for a fast paced production and tool steels are used for this application. The properties of a quality plastic injection mold steel vary from the mold manufacturer to the end-user. Good machinability as well as the ability to provide a good surface finish are important aspects for the mold manufacturer. However, uniform hardness is the key for the end-user to produce parts without shape distortion. As parts increase in size, molds have to be larger and still display these properties across the entire section.

SUMMARY OF THE INVENTION

A primary object of this invention is to provide plastic injection molding tooling sets having increased hardenability and hardness as contrasted to such sets currently available along with (1) equal or better machinability, (2) increased cleanliness together with good impact values and, (3) most importantly, increased hardenability.

Another object is to provide plastic injection tooling sets from mold blocks having the following broad composition by weight percent:

| | |
|---|---|
| Carbon | .15-.40 |
| Manganese | .60-1.10 |
| Silicon | 0.60 max |
| Chromium | 1.00-2.00 |
| Nickel | .15-1.00 |
| Molybdenum | .20-.55 |
| Vanadium | .05-.20 |
| Aluminum | .040 max |
| Phosphorous | .025 max |
| Sulfur | .025 max |

More preferably it is an object of this invention to provide plastic injection tooling sets from a mold block having the following composition by weight:

| | |
|---|---|
| Carbon | .20-.35 |
| Manganese | .70-1.10 |
| Silicon | .15-.50 |
| Chromium | 1.10-2.00 |
| Nickel | .20-.90 |
| Molybdenum | .30-.55 |
| Vanadium | .07-.20 |
| Aluminum | .040 max |
| Phosphorous | .020 max |
| Sulfur | .015 max |

Another object is to provide tooling sets from a mold block having the following most preferred composition by weight percent:

| | |
|---|---|
| Carbon | .25-.33 |
| Manganese | .80-1.10 |
| Silicon | 0.20-.45 |
| Chromium | 1.20-2.00 |
| Nickel | .30-.80 |
| Molybdenum | .35-.55 |
| Vanadium | .10-.20 |
| Aluminum | .020 aim |
| Phosphorous | .015 max |
| Sulfur | .005 max |

Yet a further object of the invention is to provide a low cost and efficient method of manufacturing plastic injection mold and die block for tooling sets having the herein disclosed alloy constituents.

Other objects and advantages will be apparent from the following description.

DESCRIPTION OF THE INVENTION

Carbon is necessary to provide the required hardness and wear resistance. If carbon is significantly higher than 0.40% the mold block will exhibit low machinability and polishing characteristics. Preferable a maximum of 0.35% carbon is used to ensure good machinability. If substantially less than 0.15% carbon is used wear resistance and mechanical properties will not be suitable for service conditions to which the mold blocks are subjected. Preferably a minimum of 0.20% carbon is used to ensure acceptable wear resistance, hardness and mechanical properties. Most preferably carbon in the range of 0.25% to 0.035% with an aim of 0.30% is used.

Manganese is essential for hardenability and as a deoxidizer in the steelmaking process. It also acts to control sulphides in forging operations in combination with the other alloying elements. If significantly higher than 1.10% is present there is a risk that retained austenite will be present. If substantially less than 0.60% manganese is present the hardenability of the mold block will be lessened. In addition, to ensure sulphur control the manganese content should be present in an amount of at least 20 times the sulphur content. Manganese also contributes to wear resistance, although to a lesser extent than other carbide formers. Preferably manganese is present in the range of 0.70% to 1.10% and most preferably from 0.80% to 1.10%.

Silicon is specified for its deoxidizing ability in the steelmaking process. If present in substantially greater quantities than 0.60% there is a predisposition toward embrittlement of the final product.

Chromium is necessary for carbide formation, for hardenability and for wear resistance. If substantially more than the maximum of 2.00% chromium is present the hardening temperature becomes too high for normal production heat treatment processes. Below the specified minimum of 1.00% the wear resistance will be negatively affected. Preferably, chromium is present in the amount of 1.10% to 2.00% and most preferably from 1.20% to 2.00%.

Nickel is required to strengthen the ferrite and provide toughness to the mold block. If present in a quantity substantially more than 1.00% there is a risk of retained austenite and decrease in machinability. Excess nickel may also promote high temperature hairline cracking which requires scarfing and/or conditioning during the forging process. If nickel is substantially less than the specified minimum of 0.30%, the mold block will have reduced hardenability and deficiency of toughness during service. Nickel should be present preferably in the range of 0.20% to 0.90% and most preferably in the range of 0.30% to 0.80%.

Molybdenum is a key element contributing to hardenability and wear resistance by the fact that it is a strong carbide former. Its beneficial effects are effective in the range of 0.20% to 0.55% molybdenum but preferably it is maintained in the upper band of the range from 0.30% to 0.55% molybdenum and most preferably in the range of 0.35% to 0.55% molybdenum.

Vanadium is a key element and is specified for its high effect on hardenability, wear resistance and grain refining properties. It has been discovered that the addition of vanadium in the specified range of 0.05% to 0.20% combined with proper heat treatment can significantly improve hardenability, particularly in large sections of at least 20 inches. Testing of steel samples with statistically constant alloy constituents except for vanadium as shown in Table 1 showed that the addition of vanadium significantly increased hardenability.

TABLE 1

| ID | C | Si | Mn | Cr | Ni | Mo | V |
|---|---|---|---|---|---|---|---|
| X0 | 0.35 | 0.40 | 0.85 | 1.82 | 0.48 | 0.53 | 0 |
| X10 | 0.35 | 0.43 | 0.97 | 1.87 | 0.47 | 0.54 | 0.10 |
| X15 | 0.36 | 0.43 | 1.01 | 1.85 | 0.50 | 0.53 | 0.13 |
| X20 | 0.35 | 0.41 | 1.00 | 1.85 | 0.49 | 0.51 | 0.19 |

For steel X0, one type of carbide was mostly present containing molybdenum and manganese. X20 showed the same carbides but with the addition of a second type of carbides containing vanadium. The vanadium carbide family is much more stable to aging when compared to chromium carbides. To have optimal effect on all characteristics, preferably vanadium is present in the range of 0.07% to 0.20%, and most preferably in the range of 0.10% to 0.20% with an aim of 0.15% as shown in the Figure. Vanadium also has a significant impact on wear resistance and machinability.

Aluminum is desirable for grain refinement but can have a detrimental effect on steel quality by causing the presence of aluminates, an undesirable impurity. It is therefore important to minimize the addition of aluminum to a maximum of 0.040% in the final melt composition. Most preferably an aim of 0.020% aluminum will achieve grain refinement.

Phosphorus could increase machinability but the detrimental effects of this element in tool steels, such as an increase in the ductile-brittle transition temperature, outweigh any beneficial effects. Accordingly, the phosphorus content should not be more than the specified maximum of 0.025% and most preferably lower than 0.015%.

Sulfur is a key element for machinability and it is commonly believed that a content up to 0.045% in tool steel would render acceptable machinability. However, sulphur also has several detrimental effects in this type of steel including hot shortness during processing and reduced polishing and texturing characteristics. Since the effect of vanadium on carbide size has a significant impact on machinability, it is desirable to maintain sulphur to a value lower than 0.025%, preferably lower than 0.015% and most preferably lower than 0.005%.

A comparison of core vs. hardness tests in mold and die block sections of 20 inches and larger has disclosed that the hardenability of the pieces are substantially uniform across the entire cross section. This is a marked improvement over tooling sets made from currently available steels in which the hardenability of such large sections tends to fall off near the center.

The preferred method of manufacturing mold and die blocks for tooling sets of this invention is as follows.

A steel melt is formed in a heating unit, preferably an electric arc furnace, the melt containing a majority but less than all of the requisite alloys, aluminum for example being deferred until near the end of the process.

After the melt is formed it is transferred to a receptacle, such as a bottom pour ladle, to thereby form a heat. Thereafter, heating, further alloying and refining the heat with argon purging until the alloys are uniformly dispersed and the alloy composition of the heat is brought into specification.

Thereafter the heat is subjected to vacuum argon degassing and then teemed into ingot molds by bottom pouring.

Following solidification, the ingots are hot worked to form the resultant low alloy steel into mold and die blocks.

Thereafter the blocks are heat treated by quenching, preferably in water, and tempered.

Although a specific example of the invention has been disclosed herein, it will be obvious to those are skilled in the art that modifications may be made within the spirit and scope of the invention. Accordingly it is intended that the scope of the invention be limited solely by the scope of the hereafter appended claims when interpreted in light of the relevant prior art.

The invention claimed is:

1. A method of manufacturing plastic injection mold and die block tooling having uniform hardenability in cross sections of 20 inches and larger, said method comprising the steps of:

(1) forming a steel melt in a heating unit having less than all of the alloy ingredients, (2) transferring said melt to a receptacle to thereby form a heat, (3) heating, further alloying and refining said heat with argon purging of the alloy composition into specification, (4) vacuum degassing, teeming and casting said heat to form ingots by bottom pouring, (5) hot working said ingots to form said low alloy steel into said mold and die blocks having cross sections of 20 inches and larger, said mold and die blocks having the following composition in weight percent:

| | |
|---|---|
| C | .20-.40%, |
| Mn | .90-1.10%, |
| Si | 0.60% max, |
| Cr | 1.00-2.00%, |
| Ni | .45-1.00%, |
| Mo | .20-.55%, |
| V | .05-.20%, |
| Al | .040% max, |
| P | .025% max, |

-continued

| | |
|---|---|
| S | .025 max, and |
| Fe | balance |

(6) heat treating by quenching and tempering, and (7) forming plastic injection molding tooling from said quenched and tempered blocks.

2. The method of manufacturing plastic injection mold and die block tooling of claim 1 further characterized in that the mold and die blocks have the following composition in weight percent:

| | |
|---|---|
| C | .20-.35%, |
| Mn | .90-1.10%, |
| Si | .15-.50%, |
| Cr | 1.10-2.00%, |
| Ni | .50-.90%, |
| Mo | .25-.55%, |
| V | .07-.20%, |
| Al | .040% max, |
| P | .020% max, |
| S | .015% max, and |
| Fe | balance. |

3. The method of manufacturing the plastic injection mold and die block tooling of claim 1 further characterized in that the molds and die blocks have the following composition in weight percent:

| | |
|---|---|
| C | .25-.33%, |
| Mn | .90-1.10%, |
| Si | .20-.45%, |
| Cr | 1.20-2.00%, |
| Ni | .50-.90%, |
| Mo | .25-.55%, |
| V | .10-.20%, |
| Al | .020% max, |
| P | .015% max, |
| S | .005% max, and |
| Fe | balance. |

4. A plastic injection mold tooling steel having uniform hardenability in cross sections of 20 inches and larger and having the following composition in weight percent:

| | |
|---|---|
| C | .20-.40%, |
| Mn | .90-1.10%, |
| Si | 0.60% max, |
| Cr | 1.00-2.00%, |
| Ni | .45-1.00%, |
| Mo | .20-.55%, |
| V | .05-.20%, |
| Al | .040% max, |
| P | .025% max, |
| S | .025% max, and |
| Fe | balance. |

5. The plastic injection mold tooling steel of claim 4 further characterized by having the following composition in weight percent:

| | |
|---|---|
| C | .20-.35%, |
| Mn | .90-1.10%, |
| Si | .15-.50%, |
| Cr | 1.10-2.00%, |
| Ni | .50-.90%, |
| Mo | .25-.55%, |
| V | .07-.20%, |
| Al | .040% max, |
| P | .020% max, |
| S | .015% max, and |
| Fe | balance. |

6. The plastic injection mold tooling steel of claim 4 further characterized by having the following composition in weight percent:

| | |
|---|---|
| C | .25-.33%, |
| Mn | .90-1.10%, |
| Si | .20-.45%, |
| Cr | 1.20-2.00%, |
| Ni | .50-.90%, |
| Mo | .25-.55%, |
| V | .10-.20%, |
| Al | .020% max, |
| P | .015% max, |
| S | .005% max, and |
| Fe | balance. |

* * * * *